United States Patent Office 3,469,818
Patented Sept. 30, 1969

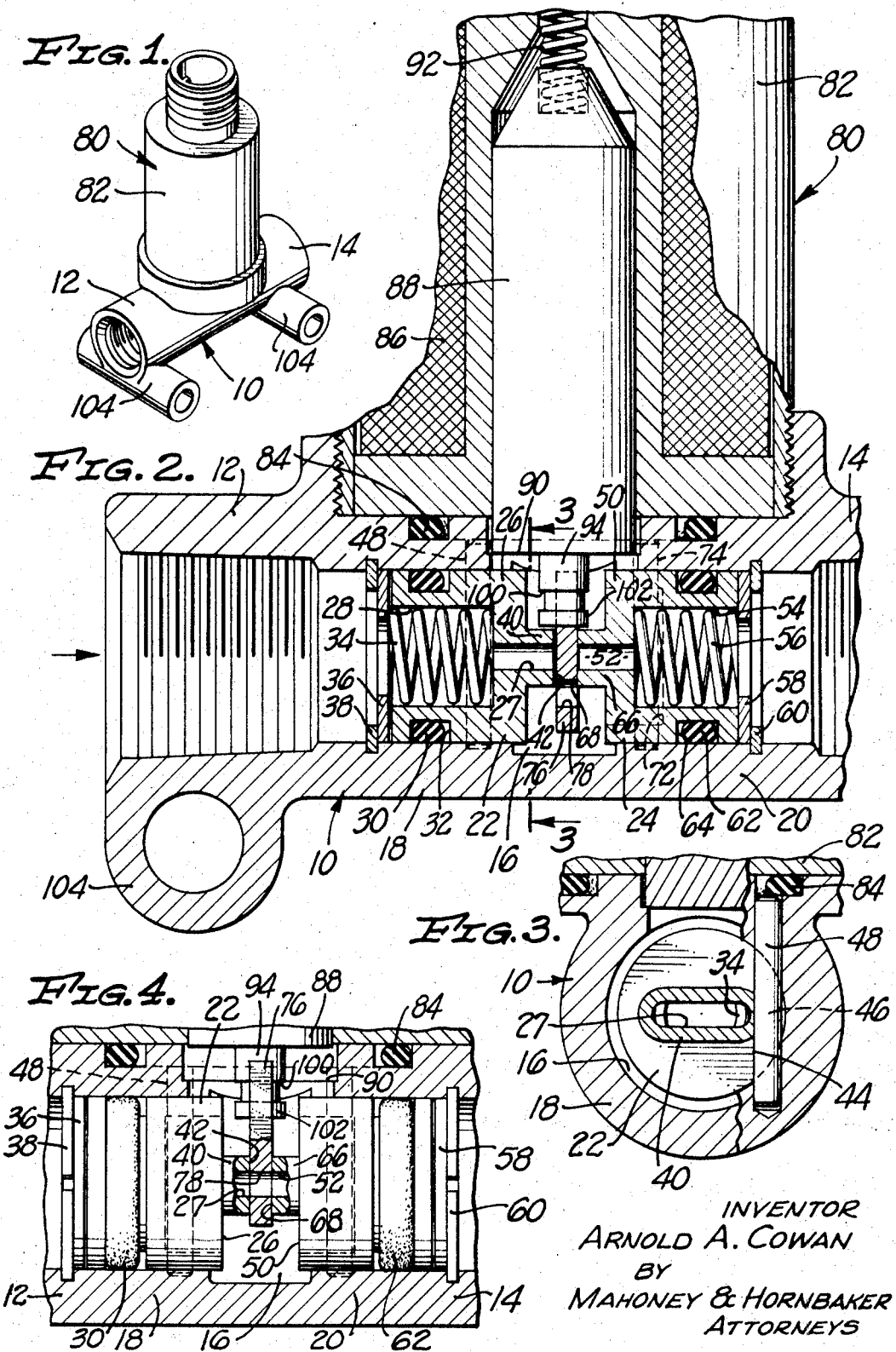

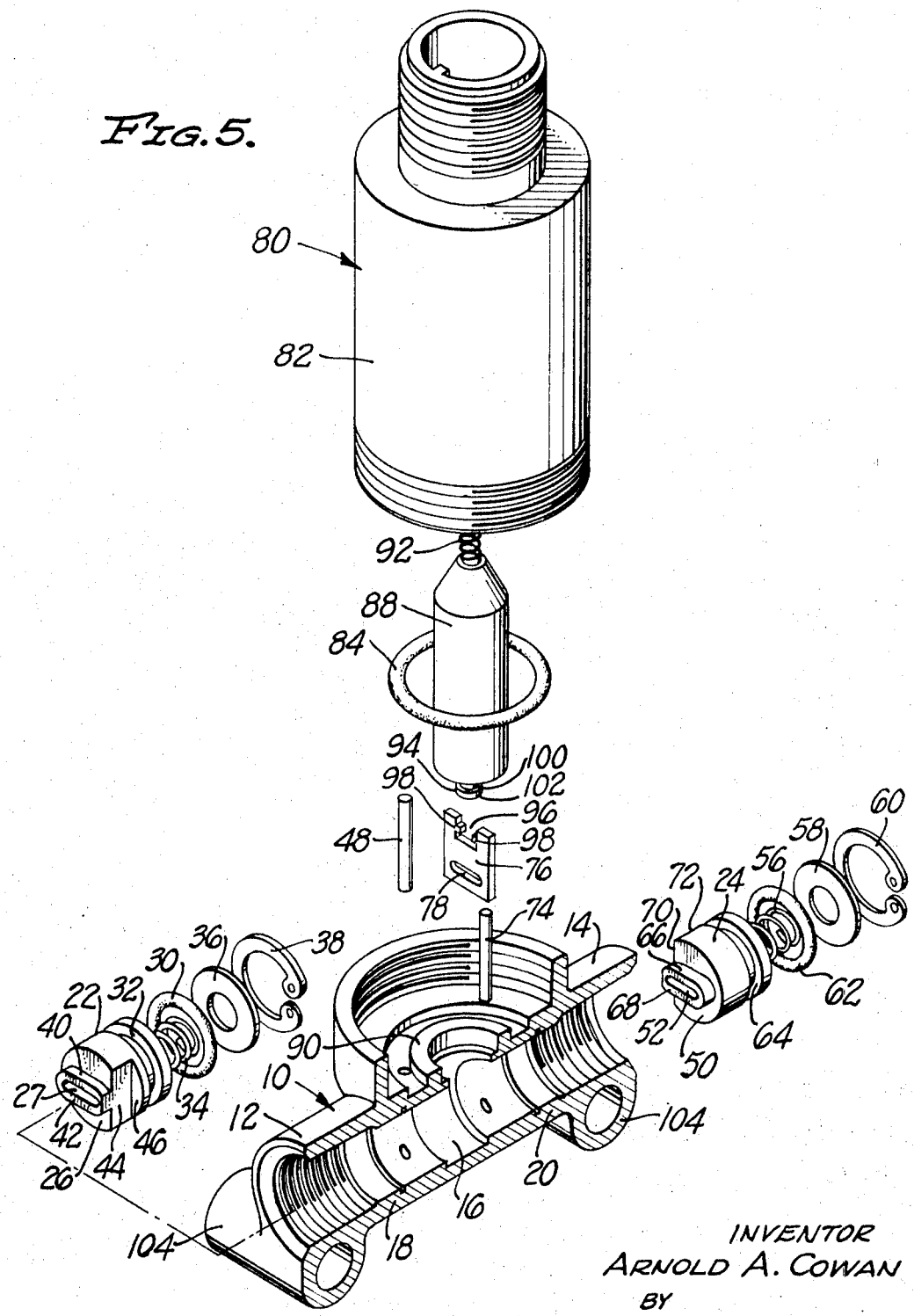

3,469,818
BALANCED SHUTOFF VALVE
Arnold A. Cowan, Tarzana, Calif., assignor, by mesne assignments, to The Bobrick Corporation, North Hollywood, Calif., a corporation of California
Filed Nov. 14, 1966, Ser. No. 594,169
Int. Cl. F16k 31/143, 25/00
U.S. Cl. 251—129                     6 Claims

ABSTRACT OF THE DISCLOSURE

A valve body has fluid inlet and outlet means therein, each including a sealing member resiliently urged longitudinally toward a central, laterally movable gate. The sealing members have openings longitudinally therethrough terminating at inner end portions in laterally elongated, slot-like openings, alignable with a similar opening longitudinally through the gate when the valve is opened and at least one closed by the gate when the valve is closed. The longitudinal movement of the sealing members is limited inwardly and the gate is mounted longitudinally shiftable whereby fluid under pressure from one sealing member against the closed gate forces the gate away from that sealing member and to seal against the other sealing member while the fluid under pressure circulates in the valve body around the gate and partially longitudinally balances said gate.

---

This invention relates to a balanced shutoff valve of the type for installation in a fluid line and the control of the flow of fluid through said valve. More particularly, this invention relates to a shutoff valve of the foregoing type having a laterally movable gate therein for the control of fluid flow therethrough and particularly adapted for movement of the gate between the valve opening and closing positions by automatic moving means which may be remotely actuated, such as solenoids and the like.

Many prior forms of valves have been provided for installation in fluid lines and for the controlling of fluid flow therethrough. Furthermore, certain of these prior fluid valves have been of the gate valve type wherein a laterally movable gate having an opening formed longitudinally therethrough is mounted between inlet and outlet members having longitudinally extending inlet and outlet openings, whereby the gate is laterally movable from a position in which the gate opening is displaced from the inlet and outlet member openings, with the gate sealing against one of the members and preventing the flow of fluid through the valve, to a second position in which the gate opening is longitudinally aligned communicating with the inlet and outlet openings permitting the flow of fluid through the valve.

One of the major difficulties with prior gate valves of this character is that in order to provide absolute opening and closing of the valve it has been necessary to construct the gate for a relatively large lateral movement between the valve closing and opening positions. This has resulted in difficulty in providing the valves automatically actionable by solenoids and the like for remote automatic control thereof. Where this automatic actuation has been absolutely required, it has been necessary to resort to solenoids and other automatic operating devices of excessive size in order that proper movement of the gate may be provided, making the valves cumbersome in size and difficult to mount in a fluid system where mounting space is at a premium.

A further difficulty with the prior gate valves of this character is that it has been difficult to provide a valve with a laterally movable gate which forms a perfect seal in valve closing position, yet requires a force for movement thereof which is sufficiently small so as to be provided by the various automatic moving means, such as solenoids, which are of reasonable size and expense. Obviously, if the laterally movable gate is to provide a perfect seal against the valve inlet and outlet members, this gate must have a relatively tight abutting fit thereagainst, which fit normally will serve to frustrate the movement of the gate relative to the inlet and outlet members during movement of the gate between the valve closing and opening positions. Thus, various types of expensive and complicated seals have been resorted to for providing a movable seal against the gate, none of which has been completely satisfactory from the sealing standpoint while still providing the necessary ease of gate movement.

In certain cases, in an attempt to solve this sealing problem, certain of the prior valves have been constructed for making use of the pressure of the fluid flowing through the valve to augment the abutment sealing force of the gate against the fluid outlet member. In other words, the prior valves have been constructed so that the fluid inlet is never sealed by the gate, but rather only the fluid outlet thereof, and the fluid entering the valve is directed by the fluid inlet against the gate when the gate is in valve closing position, thereby applying a longitudinal force against the gate tending to force the gate more firmly against the fluid outlet member and create a greater seal therebetween. This, however, merely complicates the problem since this increased sealing force created by the fluid against the gate remains until the gate has been moved into at least partial communication with the fluid outlet member so that the initial movement of the gate toward valve opening position is made even more difficult.

It is, therefore, an object of my invention to provide a shutoff valve of the gate type in which the movement of the gate between valve opening and closing positions is at a minimum, far less than has heretofore been possible with prior valves of the same character, yet the fluid flow through the valve is maintained at a maximum when the gate is in valve opening position commensurate with the equivalent size of the valve. This has been accomplished by providing the gate opening and the fluid inlet and outlet openings which must be longitudinally aligned for fluid flow through the valve of an elongated slot-like contour, with the minimum dimensions of the slot-like openings being in the direction of lateral movement of the gate. In this way, the lateral movement of the gate between valve opening and valve closing positions may be at a minimum, with the necessary area for the openings in order to obtain the desired fluid flow therethrough being provided by the elongation of the openings.

It is another object of my invention to provide a shutoff valve of the gate type in which the required force for movement of the gate between valve opening and closing positions is maintained at a minimum, yet a perfect shear seal and self-cleaning valve action is provided between the gate and the fluid outlet member of the valve when the gate is moved into the valve closing position even under relatively high fluid pressure conditions. Three unique construction features of the valve combine to provide this perfect shear sealing and self-cleaning action with the ease of gate movement, namely, unique sealing members forming parts of the fluid inlet and outlet members, a unique floating connection between the gate and the means for moving the same, and a unique gate chamber construction within the valve permitting the communication of fluid pressure to opposite sides of the gate for a balancing feature thereof.

It is still another object of my invention to provide a shutoff valve of the gate type with which actuating means, such as a solenoid of minimum size, may be used in order to provide the automatic actuation of the valve between the open and closed positions thereof. This is accomplished by the combination of minimum gate movement and minimum required force of gate movement, both previously alluded to. With the combination of minimum gate movement and minimum moving force, automatically operable actuating solenoids of minimum size may be used to control a valve having relatively high fluid flow capacity so that the valve of the present invention is particularly adapted for minimum space requirements.

Other objects and advantages of the invention will be apparent from the following specifications and the accompanying drawings which are for the purpose of illustration only, and in which:

FIG. 1 is a perspective view of an embodiment of the shutoff valve according to the principles of the present invention;

FIG. 2 is an enlarged, fragmentary, vertical, sectional view of the valve of FIG. 1 showing the valve in closed position;

FIG. 3 is a fragmentary, vertical, sectional view taken along the broken line 3—3 in FIG. 2;

FIG. 4 is a view similar to FIG. 2 and showing a part of FIG. 2, but with the valve in open position; and FIG. 5 is an enlarged, exploded, perspective view, part in section, of the valve of FIG. 1.

Referring to the drawings, the embodiment of the shutoff valve according to the principles of the present invention includes a valve body generally indicated at 10 having a fluid inlet portion 12 and a fluid outlet portion 14 separated by a gate chamber 16. In the particular valve illustrated, the fluid inlet and outlet portions 12 and 14 extend longitudinally of the valve body 10 and are longitudinally separated by the gate chamber 16, with exterior ends of the inlet and outlet portions being internally threaded in usual manner for the connection of fluid lines, not shown, in communication with the portions. Furthermore, the valve may be formed of usual materials appropriate for the functioning of the particular elements thereof and well known to those skilled in the art.

The fluid inlet and outlet portions 12 and 14 are formed with cylindrical inner end portions 18 and 20 respectively, with the inlet end portion housing a longitudinally slidable, cylindrical sealing member 22 and the outlet end portion housing a similar sealing member 24. The sealing member 22 is formed with an inner wall 26 having an elongated slot-like inlet opening 27 formed longitudinally therethrough communicating inwardly into the gate chamber 16 and outwardly through a spring opening 28 so as to provide complete longitudinal communication through the sealing member. Further, the sealing member 22 is slidably sealed against the inlet end portion 18 by a resilient O-ring 30 laterally or radially compressed within an annular sealing member groove 32 between the sealing member 22 and the inlet end portion.

The sealing member 22 is resiliently urged longitudinally toward the gate chamber 16 by a coil spring 34 positioned in the spring opening 28 and bearing inwardly against the inner wall 26, with an outer end thereof engaged longitudinally against a washer 36 secured against longitudinal outward movement by a snap ring 38 on the inlet end portion 18. The inner wall 26 is formed with a longitudinally inwardly projecting sealing portion 40 terminating inwardly in a flat, transversely or laterally extending sealing surface 42, with the sealing portion transversely or laterally surrounding the inlet opening 27 and generally following the contour of said inlet opening. A longitudinally extending cut-out 44 is formed in one side of the sealing member 22 so as to provide an inwardly facing shoulder 46 for longitudinal engagement with a laterally extending pin 48 secured in the valve body 10, thereby limiting the longitudinal inward movement of the sealing member 22 into the gate chamber 16 as resiliently urged by the spring 34.

As previously stated, the sealing member 24 is similar to the sealing member 22 so as to include an inner wall 50 having a longitudinally extending, elongated, slot-like outlet opening 52, a spring opening 54 with a spring 56, washer 58 and snap ring 60, and an O-ring 62 positioned in an annular groove 64. The sealing member 24 also similarly includes a sealing portion 66 transversely or laterally surrounding the outlet opening 52 and having a flat, transversely or laterally extending sealing surface 68, with a cut-out 70 forming a shoulder 72 engageable with a pin 74 for limiting the longitudinal inward slidable movement of the sealing member 24 and the inward projection thereof into the gate chamber 16. Thus, each of the sealing members 22 and 24 are resiliently urged longitudinally inwardly so as to project into the gate chamber 16, with this longitudinal inward movement being limited by the shoulders 46 and 72 engaging the pins 48 and 74, thereby retaining the sealing surfaces 42 and 68 of the sealing portions 40 and 66 spaced longitudinally apart within the gate chamber.

A flat transversely laterally slidably movable gate 76 is mounted within the gate chamber 16 longitudinally between the sealing member sealing surfaces 42 and 68 flatwise facing the surfaces and having a longitudinal thickness slightly greater than the minimum possible longitudinal spacing of the sealing members 22 and 24, as previously described. Also, as previously described, the inlet opening 27 of the sealing member 22 and the outlet opening 52 of the sealing member 24 are longitudinally aligned and a preferably substantially identical elongated, slot-like opening 78 is formed longitudinally through the gate 76. The gate 76 is vertically suspended within the gate chamber 16 by gate moving means in the form of an electric solenoid, generally indicated at 80, in a manner to be hereinafter described, and of importance to certain of the principles of the present invention, with said gate being vertically or transversely or laterally movable relative to the inlet and outlet end portions 18 and 20, and the sealing members 22 and 24 thereof between a lower closed position in which the gate opening is displaced downwardly from the inlet and outlet openings 27 and 52 normal or perpendicular to the elongations of said inlet and outlet openings and an upper open position in which the gate opening is longitudinally aligned and matching and providing longitudinal communication between the inlet and outlet openings.

The solenoid 80 is generally of usual construction, except for the connection thereof to the gate 76, and includes a solenoid housing 82 threadably secured on the valve body 10 sealed fluid tight by an O-ring 84, with the housing enclosing an annular solenoid coin 86 and vertically reciprocally mounting a solenoid plunger 88 axially overlying the gate chamber 16. In the nonactuated position of the solenoid 80, the plaunger 88 rests downwardly adjacent a shoulder 90 of the valve body 10, being positively urged downwardly thereto by a spring 92 between the plunger and the solenoid housing 82, and with a gate mounting portion 94 of the plunger projecting downwardly through the valve body into the gate chamber 16. In the actuated position of the solenoid 80, as provided by electrically energizing the solenoid coil 86, the solenoid plunger 88 is withdrawn upwardly a greater distance within the solenoid coil so that the gate mounting portion 94 of the plunger is spaced above the solenoid nonactuated position, as shown in FIG. 4.

As shown in FIG. 5, the gate 76 is formed with a longitudinally extending and verically upwardly or laterally opening mounting slot 96, having oppositely depending mounting tabs 98 projecting oppositely therein, and the gate mounting portion 94 of the solenoid plunger 88 is formed with an annular groove 100 providing an annular mounting flange 102. Thus, the gate 76 may be engaged with the gate mounting portion 94 of the solenoid plunger 88 by sliding the gate mounting tabs 98 longitudinally into the mounting portion groove 100 of the plunger gate mounting portion so that the tabs are laterally engaged with the mounting portion mounting flange 102. This provides the gate vertically or transversely or laterally movable with the solenoid plunger 88, yet the gate is longitudinally flatwise slidable or shiftable relative to the plunger gate mounting portion 94 in the direction of the sealing members 22 and 24 and the sealing surfaces 42 and 68 thereof, that is, providing the gate longitudinally flatwise slidable or shiftable in the direction toward the inner end portions 18 and 20 of the fluid inlet and outlet portions 12 and 14. Further, the slidable or shiftable mounting of the gate 76 on the solenoid plunger 88 provides a unique co-operation between the sealing members 22 and 24, according to certain of the principles of the present invention.

In the operation of the shutoff valve, according to the principles of the present invention, when the solenoid 80 is in nonenergized or nonactuated position, as shown in FIG. 2, the solenoid plunger 88 is in its lower nonactuated position and the gate 76 is slid transversely or laterally downwardly relative to the sealing members 22 and 24 so that the gate opening 78 is transversely or laterally displaced from the sealing member inlet and outlet openings 27 and 52, placing the valve in closed position. In the valve closed position and prior to any fluid under pressure being directed into the fluid inlet portion 12, the gate 76 will be centered in the gate chamber 16 resiliently pinched between the sealing members 22 and 24 (not shown). Immediately upon fluid under pressure being directed into the fluid inlet portion 12, however, the fluid passing through the sealing member inlet opening 27 will bear longitudinally against the gate 76, forcing the gate to slide or shift longitudinally flatwise in the direction toward the sealing surface 68 of the sealing member 24, thereby forcing sealing member 24 to move longitudinally to the right to the position shown in FIG. 2 while the gate 76, of course, moves therewith. Since the inward longitudinal movement of the sealing member 22 is limited by the engagement of the sealing member shoulder 46 with the pin 48, the longitudinal shifting of the gate 76 will eventually move the gate away from the sealing surface 42 of the sealing member 22 while the sealing member 22 remains longitudinally stationary held by the pin 48, and at the same time, the gate will force the sealing member 24 slightly outwardly away from engagement with the pin 74 to the position shown in FIG. 2.

In this manner, a portion of the pressure of the fluid entering the fluid inlet portion 12 and the sealing member 22 thereof is applied longitudinally against the gate 76 to provide a tight shear seal of the gate flatwise against the sealing surface 68 of the sealing member 24 in the fluid outlet portion 14. At the same time, however, the limiting of the inward movement of the sealing member 22 in the fluid inlet portion 12 by the pin 48 permits the gate 76 to move away from the sealing surface 42 of the sealing member 22 so as to provide fluid communication into and around the gate chamber 16. The contour of the gate chamber 16 is such that fluid communication is provided around the gate to and against a portion of the opposite side thereof, that is, the side thereof facing the sealing member 24 of the fluid outlet portion 14, to thereby counteract or partially relieve a portion of the fluid pressure against the side of the gate facing the sealing member 22 of the fluid inlet portion 12 so as to create what may be termed a balanced gate or balanced valve having a portion of the transmitted fluid pressure acting against the gate for sealing the same, yet relieving a portion of such pressure in order that the gate may be moved relative to the sealing members between closed and open positions.

When it is desired to open the valve, the solenoid 80 is electrically actuated for withdrawing the solenoid plunger 88 upwardly and moving the gate 76 upwardly or laterally relative to sealing members 22 and 24 to the position shown in FIG. 4. In this open position of the gate 76, the gate opening 78 is longitudinally aligned with the inlet and outlet openings 27 and 52 of the sealing members 22 and 24 so that free fluid communications or flow is provided longitudinally through the sealing members and the gate longitudinally through the valve body 10 and between the fluid inlet and outlet portions 12 and 14. Since the fluid is flowing freely through the sealing members 22 and 24 and through the gate 76, the fluid pressure against the gate is relieved and the sealing members, resiliently urged against the gate will longitudinally flatwise shift and center the same in the gate chamber 16 resiliently pinched therebetween, each of the sealing members abutting the opposite faces of the gate with the respective sealing member sealing surfaces 42 and 68 resiliently urged for fluid tight shear seals therewith.

The solenoid 80 may be provided with usual electrical connections and electrical controls (not shown). Further, the valve body 10 may be provided with mounting bosses 104 for mounting the valve in a mechanism, not shown, in which the valve is incorporated.

Although the fluid inlet and outlet portions 12 and 14, and the inlet and outlet openings 27 and 52 have been referred to using the terms "inlet" and "outlet," it is obvious with the valve construction of the present invention that the fluid flow therethrough could be reversed and the valve will operate virtually in the identical manner, or the valve could be incorporated in a fluid system in which fluid will flow therethrough alternately in opposite directions, still operating in virtually the identical manner in each such direction. Furthermore, although the means for actuating the valve, that is, the means for moving the gate 76 between the valve closing and opening positions, has been shown and described herein as an electric solenoid 80, it is also obvious that fluid actuated solenoids could be used, or any other means for moving the gate between said positions without departing from the basic principles of the present invention. Such terms and descriptions, therefore, are used in the present specification and the appended claims for illustration and reference purposes and are not intended to unduly limit the scope of the present invention.

Thus, I have provided, according to the present invention, a shutoff valve of the gate type wherein the solenoid 80 for actuating the same between closed and open positions may be of a relatively small stroke so as to be of minimum size in view of the unique elongated slot-like configurations of the fluid inlet and outlet openings 27 and 52 and the gate opening 78. Furthermore, the unique construction of the inlet and outlet sealing members 22 and 24 in co-operation with the uniquely slidably supported or freely longitudinally shiftable gate 76 provides a balanced shutoff valve which retains positive shear sealing in the closed position and positive shear sealed flow in the open position, yet due to the balancing of the gate, does not require excessive force for movement of the gate between the valve closing and opening positions so as to again minimize the required size of the solenoid 80.

Still further, in view of the fact that the gate 76 is pinched flatwise longitudinally between the sealing member flat sealing surfaces 42 and 68 in the open position and moves slidably laterally along such surfaces into the closed position, self-cleaning of all of said gate and sealing surfaces takes place by a lateral wiping or sliding action, always assuring a positive clean shear seal therebetween in either open or closed position. Also, with the gate 76 always being maintained flatwise against the sealing member sealing surface 68 in movement between the open and closed positions despite the longitudinal shifting of the gate and sealing member 24, and with the addition of the sliding self-cleaning action, it is impossible for foreign matter to disturb the perfect valve closed shear sealing action of the gate.

I claim:

1. In a shutoff valve, the combination of: a valve body, fluid inlet means in said body having an inner end portion, an inlet opening formed longitudinally through said inner end portion; fluid outlet means in said body having an inner end portion spaced longitudinally from said inlet means inner end portion, an outlet opening formed longitudinally through said outlet means inner end portion; a transversely slidable gate between said inner end portions of said inlet and outlet means, said gate being movable between a closed position wherein said gate opening is transversely displaced from said inlet and outlet openings with said gate sealing against at least one of said inner end portions and an open position wherein said gate opening is generally longitudinally aligned communicating between said inlet and outlet openings; means operably connected to said gate for moving said gate between said open and closed positions and for moving said gate longitudinally flatwise shiftable, in directions toward said inner end portions of said inlet and outlet means; said fluid inlet and outlet means each including sealing members resiliently urged oppositely longitudinally toward said gate having flat sealing surfaces facing said gate and forming said inner end portions, said inlet and outlet openings being formed in said sealing member flat sealing surfaces; means in said body for providing fluid communication around said gate between the sides of said gate facing said inner end portions of said inlet and outlet means; and means operably connected between said body and said sealing member of said fluid inlet means for limiting longitudinal movement of said inlet means sealing member toward said gate to an extent that fluid under pressure through said inlet means sealing member when said gate is in said closed position will force said gate to shift longitudinally away from said inlet means sealing member while said gate seals longitudinally against said sealing member of said fluid outlet means, said fluid under pressure after said gate shifting circulating through said fluid communication means of said body and around said gate to partially longitudinally balance said gate.

2. A shutoff valve as defined in claim 1 in which said sealing member limiting means is operably connected between said body and each of said inlet and outlet means sealing members for limiting longitudinal movement of said each sealing member toward said gate to an extent that fluid under pressure through either one of said sealing members when said gate is in said closed position will force said gate to shift longitudinally away from that particular sealing member while said gate seals longitudinally against the other of said sealing members, said fluid under pressure after said gate shifting circulating through said fluid communication means of said body and around said gate to partially longitudinally balance said gate.

3. In a shutoff valve, the combination of: a valve body, fluid inlet means in said body having an inner end portion, a transversely elongated slot-like inlet opening formed longitudinally through said inner end portion; fluid outlet means in said body having an inner end portion spaced longitudinally from said inlet means inner end portion, a transversely elongated slot-like outlet opening formed longitudinally through said outlet means inner end portion; a gate between said inner end portions of said inlet and outlet means transversely slidable in a transverse direction substantially normal of said transverse elongations of said inlet and outlet openings of said fluid inlet and outlet means, said gate having a transversely elongated slot-like opening formed longitudinally therethrough and transversely elongated in the same transverse direction as said inlet and outlet openings, said gate being movable between a closed position wherein said gate opning is transversely displaced in said normal direction from both said inlet and outlet openings with said gate sealing against at least one of said inner end portions and an open position wherein said gate opening is in longitudinal communication with said inlet and outlet openings; means operably connected to said gate for morving said gate between said open and closed positions and for permitting movement of said gate longitudinally flatwise shiftable in directions toward said inner end portions of said inlet and outlet means; said fluid inlet and outlet means each including sealing members resiliently urged oppositely longitudinally toward said gate having flat sealing surfaces facing said gate and forming said inner end portions, said inlet and outlet openings being formed in said sealing member flat sealing surfaces; means in said body for providing fluid communication around said gate between the sides of said gate facing said inner end portions of said inlet and outlet means; and means operably connected between said body and said sealing member of said fluid inlet means for limiting longitudinal movement of said inlet means sealing member toward said gate to an extent that fluid under pressure through said inlet means sealing member when said gate is in said closed position will force said gate to shift longitudinally away from said inlet means sealing member while said gate seals longitudinally against said sealing member of said fluid outlet means, said fluid under pressure after said gate shifting circulating through said fluid communication means of said body and around said gate to partially longitudinally balance said gate.

4. A shutoff valve as defined in claim 3 in which said sealing member limiting means is operably connected between said body and each of said inlet and outlet means sealing members for limiting longitudinal movement of said each sealing member toward said gate to an extent that fluid under pressure through one of said sealing members when said gate is in said closed position will force said gate to shift longitudinally away from that particular sealing member while said gate seals longitudinally against the other of said sealing members, said fluid under pressure after said gate shifting circulating through said fluid communication means of said body and around said gate to partially longitudinally balance said gate.

5. In a shutoff valve, the combination of: a valve body, fluid inlet means in said body having an inner end portion, a transversely elongated slot-like inlet opening formed longitudinally through said inner end portion; fluid outlet means in said body having an inner end portion spaced longitudinally from said inlet means inner end portion, a transversely elongated slot-like outlet opening substantially identical to said inlet opening formed longitudinally through said outlet means inner end portion, said outlet opening being longitudinally aligned with said inlet opening; a gate between said inner end portions of said inlet and outlet means transversely slidable in a transverse direction substantially normal to said transverse elongations of said inlet and outlet openings of said fluid inlet and outlet means, said gate having a transversely elongated slot-like opening formed longitudinally therethrough substantially identical to said inlet and outlet openings and transversely elongated in the same transverse direction as said inlet and outlet openings, said gate being movable between a closed position wherein said gate opening is transversely displaced in said normal direction from said inlet and outlet openings with said gate sealing against at least one of said inner end portions and an open position wherein said gate opening is longitudinally aligned with said inlet and outlet openings; said fluid inlet and outlet means each including sealing members resiliently urged oppositely longitudinally toward said gate having flat sealing surfaces facing said gate and forming said inner end portion, said inlet and outlet openings being formed in said sealing member flat sealing surfaces; and means operably connected to said gate for moving said gate between said open and closed positions, said gate being operably connected to said means for moving said gate longitudinally flatwise shiftable in directions toward said inner end portions of said inlet and outlet means; means in said body for providing fluid communication around said gate between the sides of said gate facing said inner end portions of said inlet and outlet means; and means operably connected between said body and said sealing member of said fluid inlet means for limiting longitudinal movement of said inlet means sealing member toward said gate to an extent that fluid under pressure through said inlet means sealing member when said gate is in said closed position will force said gate to shift longitudinally away from said inlet means sealing member while said gate seals longitudinally against said sealing member of said fluid outlet means, said fluid under pressure after said gate shifting circulating through said fluid communication means of said body and around said gate to partially longitudinally balance said gate.

6. A shutoff valve as defined in claim 5 in which there is means operably connected between said body and each of said sealing members for limiting longitudinal movement of said sealing members toward said gate; and in which said sealing member limiting means of each of said inlet and outlet means sealing members is constructed and arranged for limiting longitudinal movement of said each sealing member toward said gate to an extent that fluid under pressure through either one of said sealing members when said gate is in said closed position will force said gate to shift longitudinally away from that particular sealing member while said gate seals longitudinally against the other of said sealing members, said fluid under pressure after said gate shifting circulating through said fluid communication means of said body and around said gate to partially longitudinally balance said gate.

References Cited

UNITED STATES PATENTS

| | | | |
|---|---|---|---|
| 2,750,962 | 6/1956 | Kreitchman et al. | 251—129 X |
| 2,835,468 | 5/1958 | Sparks | 251—176 X |
| 3,183,926 | 5/1965 | Boudot | 251—326 X |
| 3,215,157 | 11/1965 | Anderson et al. | 251—327 X |
| 3,223,380 | 12/1965 | Hochmuth et al. | 251—327 X |
| 3,301,523 | 1/1967 | Lowrey | 251—328 X |
| 3,353,784 | 11/1967 | Grove | 251—174 |
| 1,296,746 | 3/1919 | Bodmer | 251—175 X |

FOREIGN PATENTS

| | | |
|---|---|---|
| 500,861 | 3/1954 | Canada. |

ARNOLD ROSENTHAL, Primary Examiner

U.S. Cl. X.R.

251—174, 175, 327